United States Patent [19]

Fukuda et al.

[11] Patent Number: 4,728,798

[45] Date of Patent: Mar. 1, 1988

[54] RADIATION IMAGE STORAGE PANEL AND PROCESS FOR THE PREPARATION OF THE SAME

[75] Inventors: Hideo Fukuda, Fujinomiya; Masamitu Nonomura; Satoshi Arakawa, both of Kaisei, all of Japan

[73] Assignee: Fuji Photo Film Co., Ltd., Japan

[21] Appl. No.: 846,792

[22] Filed: Apr. 1, 1986

[30] Foreign Application Priority Data

Apr. 3, 1985 [JP] Japan .................................. 60-70240

[51] Int. Cl.⁴ ................................................ G01T 1/10

[52] U.S. Cl. .............................. 250/484.1; 250/327.2; 428/690

[58] Field of Search .......................... 250/327.2, 484.1; 428/690, 170, 157; 427/293

[56] References Cited

U.S. PATENT DOCUMENTS

| | | | |
|---|---|---|---|
| 4,239,968 | 12/1980 | Kotera et al. | 250/327.2 |
| 4,350,893 | 9/1982 | Takahashi et al. | 250/484.1 |
| 4,394,581 | 7/1983 | Takahashi et al. | 250/484.1 |
| 4,491,736 | 1/1985 | Teraoka | 250/484.1 |
| 4,510,174 | 4/1985 | Holzapfel et al. | 427/65 |
| 4,511,802 | 4/1985 | Teraoka | 250/484.1 |
| 4,581,088 | 4/1986 | House | 156/219 |

*Primary Examiner*—Janice A. Howell
*Assistant Examiner*—Constantine Hannaher
*Attorney, Agent, or Firm*—Gerald J. Ferguson, Jr.; Michael P. Hoffman; Michael J. Foycik, Jr.

[57] ABSTRACT

In a radiation image storage panel comprising a support, a phosphor layer containing a stimulable phosphor and a binder, and a protective film superposed in this order, the improvement in which the thickness of the phosphor layer at the edge on at least two sides being opposite to each other is less than the mean thickness of the phosphor layer and the density of the stimulable phosphor at said edge is higher than the mean density of the stimulable phosphor in the phosphor layer.

8 Claims, 2 Drawing Figures

RADIATION IMAGE STORAGE PANEL AND PROCESS FOR THE PREPARATION OF THE SAME

BACKGROUND OF THE INVENTION

1. Field of the Invention

The present invention relates to a radiation image storage panel employable in a radiation image recording and reproducing method utilizing a stimulable phosphor, and a process for the preparation of the same. 2. Description of Prior Arts For obtaining a radiation image, there has been conventionally employed a radiography utilizing a combination of a radiographic film having a sensitive silver salt material layer and an intensifying screen.

As a method replacing the above-mentioned conventional radiography, a radiation image recording and reproducing method utilizing a stimulable phosphor as described, for instance, in U.S. Pat. No. 4,239,968, has been developed and paid much attention. The method involves steps of causing a stimulable phosphor to absorb a radiation having passed through an object or having radiated from an object; sequentially exciting (or scanning) the phosphor with an electromagnetic wave such as visible light or infrared rays (stimulating rays) to release the radiation energy stored in the phosphor as light emission (stimulated emission); photoelectrically detecting the emitted light to obtain electric signals; and reproducing the radiation image of the object as a visible image, numerals, symbols, etc. from the electric signals.

In the radiation image recording and reproducing method, a radiation image is obtainable with a sufficient amount of information by applying a radiation to the object at a considerably smaller dose, as compared with the conventional radiography. Accordingly, the radiation image recording and reproducing method is of great value, especially when the method is used for medical diagnosis.

In performing the radiation image recording and reproducing method, a stimulable phosphor is generally employed in the form of a radiation image storage panel having four sides (also referred to as stimulable phosphor sheet, and generally in the form of a sheet of rectangle, square, etc.) which comprises a support and a phosphor layer provided thereon. The phosphor layer comprises a stimulable phosphor and a binder. Further, a protective film made of a transparent plastic film is provided on a surface of the phosphor layer to protect the phosphor layer from physical and chemical deterioration.

The radiation image storage panel does not serve to finally record image information, but only stores the information temporarily to provide the image or the like on an independently prepared final recording medium as described above. Accordingly, the radiation image storage panel can be repeatedly used and such repeated use brings about economical advantage.

When a radiation image storage panel is repeatedly used, the panel is first subjected to a read-out process to recover the recorded radiation energy to obtain a desired image information and then subjected to a process for erasing the remaining radiation energy therefrom in the manner as disclosed in Japanese Patent Provisional Publications No. 56(1981)-11392 and No. 56(1981)-12599. Thus, the radiation image storage panel is advantageously used repeatedly.

The radiation image storage panel can be repeatedly used in the following two representative processes. One process comprises use of a cassette for encasing the panel when the panel is transferred from the recording stage to the reproducing stages and vice verse. Another process comprises use of a endless conveying means for directly fixing the panel thereon and conveying it in cycle.

In the former process, the radiation image storage panel is repeatedly removed from and placed in the cassette by an operator, and is accordingly brought into physical contact with the side walls of the cassette. This physical contact causes physical deterioration of the panel. For obviating such contact and physical deterioration caused by the contact, the conventional radiation image storage panel is generally cut obliquely (i.e., chamferred) at the side edge.

The repeated use of the radiation image storage panel can be done, for instance, in the case that a radiation image information recording and reading device employing the radiation image storage panel is mounted on a traveling station such as a radiographic apparatuscarrying car to conduct mass radiographic examination in various places. In more detail, it is inconvenient to carry a great number of radiation image storage panels on a traveling station. Further, there is a limitation on the number of sheets capable of being carried on a car such as a radiographic apparatus-carrying car. Accordingly, it is practically useful that the radiation image storage panels are mounted on a radiographic car under such conditions that the radiation image storage panels are repeatedly used; radiation image information of an object is recorded on each radiation image storage panel and read out to obtain image information as a signal; and the obtained signal is transferred to a recording medium having a great recording capacity such as a magnetic tape so as to repeatedly use the radiation image storage panel in cycle. This means that radiation images of a number of objects can be obtained by use of a small number of radiation image storage panels. Further, the combination of the repeated use of the radiation image storage panels with a continuous radiographic process enables to perform rapid radiography in the mass radiographic examinations. This combination is of great value in practical use.

In the case that the device for recording and reading out the radiation image is carried on a traveling station such as a a radiographic apparatus-carrying car, the device is desirably mounted on the traveling station in the form of a united built-in device which comprises an image recording means for exposing a radiation image storage panel to a radiation having passed through an object so as to record and store a radiation image in the radiation image storage panel, a read-out means for reading out the radiation image stored in the radiation image storage panel, an erasure means for releasing and erasing radiation energy remaining in the radiation image storage panel for the next use of the radiation image storage panel, and a conveyance means for moving the radiation image storage panel in cycle to each of the aforementioned means. The radiation image information recording and reading device having the abovementioned constitution have various advantages not only in mounting in the traveling station such as a radiographic apparatuscarrying car but also in setting in hospitals, so that the above device is convenient in practical use.

The above-mentioned device for recording and reading out radiation image information in which the radiation image storage panel is repeatedly employed in cycle is disclosed in Japanese Patent Application 58(1983)-66730 filed in the name of the present assignee, etc. Such device generally employs a radiation image storage panel-conveying system in which the panel is conveyed horizontally as well as conveyed vertically or nearly vertically in the device. The use of such combined conveying process is very advantageous to make the device compact.

In the conveying process comprising continuous movement of the radiation image storage panel in different directions, the front edge of the moving panel repeatedly strikes against a conveying roller, a conveying belt and the like. Such strike at the front edge likely causes physical deterioration or damage of the panel.

For obviating the physical deterioration of the moving radiation image storage panel caused by striking against the conveying members at the front edge, a number of measures have been thought. Such measures comprises provision of a reinforcing member to the front edge, coating the front edge with a resin, and inward retract of the phosphor layer on the support at the front edge. These measures have such disadvantage that additional processing of the radiation image storage panel is required.

SUMMARY OF THE INVENTION

It is an object of the present invention to provide a radiation image storage panel which is improved in resistance to physical deterioration or damage in a conveying process of the panel, particularly, in a conveying process involved in a device for recording and reproducing (or reading out) radiation image information in which the radiation image storage panel is repeatedly used in cycle.

It is another object of the invention to provide a process for advantageously preparing a radiation image storage panel which is resistant to physical deterioration or damage in the conveying process.

There is provided by the present invention an improvement of a radiation image storage panel comprising a support, a phosphor layer containing a stimulable phosphor and a binder, and a protective film superposed in this order, in which the thickness of the phosphor layer at the edge on at least two sides (preferably at all four sides) being opposite to each other is less than the mean thickness of the phosphor layer and the density of the stimulable phosphor at said edge is higher than the mean density of the stimulable phosphor in the phosphor layer.

The above-mentioned improved radiation image storage panel is readily prepared by a process comprising cutting a continuous radiation image storage panel sheet material, in which at least two edges (preferably all four edges) of the panel being opposite to each other are formed by simultaneously cutting the continuous sheet material by means of a cutter having an angled edge.

DETAILED DESCRIPTION OF THE INVENTION

The radiation image storage panel of the invention is reduced in chance to contact, at its edges, an inner or outer surface of a side wall of a cassette when it is removed from or introduced into the cassette, and further reduced in physical deterioration or damage occurring when it is brought into contact with the side wall because the edges thereof have high strength. The radiation image storage panel of the invention is also advantageously reduced in physical deterioration when it is conveyed in a device for recording and reading out radiation image information in which the panel is repeatedly used in cylce.

The radiation image storage panel of the invention has the above-stated strike-resistant structure on at least two side edges opposing to each other in which either side edge can be directed to serve as the front end in the operation for conveying the panel. Accordingly, there is not restriction with respect to the direction of conveying the radiation image storage panel of the invention. Further, when the radiation image storage panel is conveyed backward and forward, it is reduced in the physical deterioration or damage at either the front end or the rear end.

Moreover, a radiation image storage panel having the characteristic features according to the invention at all four side edges is reduced at all side edges in chance to contact the cassette or the conveying members of the device and further enhanced at all side edges in resistance at the time of striking against the device.

The aforementioned process of the present invention is favorably adopted for preparing a radiation image storage panel being reduced in chance to contact the cassette, etc. and being enhanced in resistance to strike, and the process is free from the conventionally employed additional processing such as chamferring the edge or reinforcing the edge with a reinforcing material.

The present invention will be described more in detail hereinafter referring to the accompanying drawings.

Figure 1:
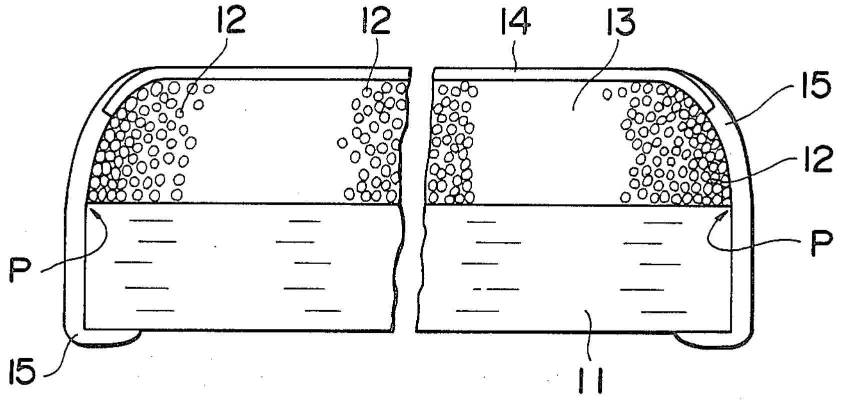
FIG. 1 is a schematic view illustrating the constitution of a radiation image storage panel according to the present invention

FIG. 1 is a schematic view illustrating the constitution of a radiation image storage panel according to the present invention.

The radiation image storage panel of the present invention has the same basic structure as the conventional radiation image storage panel, which comprises a support 11, a phosphor layer 13 containing a stimulable phosphor 12 and a binder, and a protective film 14 superposed in this order. The improvement of the invention resides in that the thickness of the phosphor layer at the edge on at least two sides (the right and left side edges in FIG. 1) being opposite to each other is less than the mean thickness of the phosphor layer, preferably the thickness being 90% or less based on the mean thickness, and the density of the stimulable phosphor at said edge is higher than the mean density of the stimulable phosphor, preferably 110% or higher based on the mean density, in the phosphor layer. The density of the stimulable phosphor is expressed by an amount of the stimulable phosphor by weight contained in a unit volume.

The above-described characteristic structure of the invention enhances physical strength at the side edges of the radiation image storage panel. Accordingly, the radiation image storage panel is improved in resistance to physical deterioration or damage occurring in striking at the edges against the conveying member, etc. Further, since the thinned edge portion serves favorably for obviating the contact of the panel with the conveying member, etc., the panel is less physically deteriorated even when it is repeatedly employed in cycle in the continuous conveying system.

The radiation image storage panel of the invention preferably has a feature in that the mean void ratio in the area from the thinned edge (P point in FIG. 1) to the distance as long as one thirds of the mean thickness of the phosphor layer is 80% or lower based on the mean void ratio of the phosphor layer. The mean void ratio of a phosphor layer of a radiation image storage panel generally is in the range of 30 to 40%. The decrease of the void ratio at the side edges favorably influences on increase of the physical strength at these edge portions.

The radiation image storage panel of the invention preferably has a feature in that the edge portions of the phosphor layer having less thickness are coated with a resin layer 15. This feature further favorably infuences on increase the resistance of the panel to strike. The coating of the edge with a resin can be done by a method of coating the edge with a film-forming polymer material or placing a polymer material film at the edge.

The polymer coating layer can be provided to the side edge of the radiation image storage panel, for instance, by applying a solution of a film-forming polymer in a solvent to the side edge and then drying to remove the solvent, or applying reactive materials (s) to form a polymer material to the side edge and causing a reaction to form in-situ the polymer coating film. There is no specific limitation on the film-forming polymer employable in the process. For instance, polyurethaneacrylic resin or a mixture of acrylc resin and vinyl chloride-vinyl acetate copolymer (which is disclosed in Japanese Patent Provisional Publication No. 58(1983)-68746) can be used.

The polymer film can be produced from an optionally chosen polymer material. Examples of the employable polymer material for the preparation of the polymer film include cellulose acetate, polymethyl methacrylate, polyethylene terephthalate and polythylene. The polymer film is generally provided to the side edge via an adhesive or sticky layer which is previously provided on the portion in the vicinity of the side edges of the radiation image storage panel and/or the polymer film.

The radiation image storage panel of the invention having the improved strike-resitance can be prepared utilizing a process for preparing a radiation image storage panel comprising a support, a phosphor layer containing a stimulable phosphor and a binder, and a protective film superposed in this order by cutting continuous radiation image storage panel sheet material, in which at least two edges of the panel being opposite to each other are formed by simultaneously cutting the continuous sheet material by means of a cutter having an angled edge.

The continuous sheet material comprising a support, a phosphor layer containing a stimulable phosphor and a binder, and a protective film superposed in this order and a process for the preparation of the same is already known.

Materials for constituting the radiation image storage panel are already known. The preparation of the continuous radiation image storage panel sheet material can be done using optionally chosen material.

Examples of the support material include plastics such as cellulose acetate and polyethylene terephtahalate, a metal sheet such as aluminum foil, an ordinary paper, a baryta paper, and a resin-coated paper. The surface of the support on the side to receive the phosphor layer can be provided with other functional layer(s) such as an adhesive layer, a light-reflecting layer and a light-absorbing layer.

The phosphor layer essentially comprises stimulable phosphor particles dispersed in a binder. A great number of stimulable phosphors are known. The stimulable phosphor employed in the invention can be selected from the known stimulable phosphors. Examples of the known stimulable phosphor include a divalent europium activated alkaline earth metal fluorohalide phosphor ($M^{II}FX{:}Eu^{2+}$, 6 in which $M^{II}$ is at least one alkaline earth metal selected from the group consiting of Mg, Ca and Ba; and X is at least one halogen selected from the group consisting of Cl, Br, and I); and europium and samarium activated strontium sulfide phosphor (SrS:Eu,Sm); an europium and samarium activated lanthanum oxysulfide phosphor ($La_2O_2S{:}Eu,Sm$); an europium activated barium aluminate phosphor ($BaO{\cdot}Al_2O_3{:}Eu$); an europium activated alkaline earth metal silicate phosphor ($M^{2+}O{\cdot}SiO_2{:}Eu$, in which $M^{2+}$ is at least one alkaline earth metal selected from the group consisting of Mg, Ca and Ba); a cerium activated rare earth oxyhalide phosphor (LnOX:Ce, in which Ln is at least one rare earth element seletected from the group consisting of La, Y, Gd and Lu; and X is at least one halogen selected from the group consisting of Cl, Br and I) and the like.

The above-mentioned stimulable phosphors are not given to restrict the stimulable phosphor employable for the radiation image storage panel of the invention. Other stimulable phosphors can be employed.

A transparent protective film is then provided on the surface of the phosphor layer to physically and chemically protect the phosphor layer. Examples of the material employable for the preparation of the transparent protective film include cellulose acetate, polymethyl methacrylate, polyethylene terephthalate and polyethylene. The transparent protective film generally has a thickness within the range of approx. 0.1–20 μm.

The radiation image storage panel can be colored with an appropriate colorant as described in U.S. Pat. No. 4,394,581 and U.S. patent application No. 326,642, now U.S. Pat. No. 4,491,736. Further, white powder may be dispersed in the phosphor layer as described in U.S. Pat. No. 4,350,893.

The continuous radiation image storage panel sheet material having the above-described structure is generally cut to have the desired sizes for practical use by means of a cutter such as guillotine cutter. Such known cutting process cannot give the radiation image storage panel having the aforementioned characteristic structure according to the invention.

According to study of the present inventors, the radiation image storage panel of the invention can be readily prepared by a process of forming two, three or four(i.e., all) edges of the panel by simultaneously cutting the continuous sheet material by means of a cutter having an angled edge as illustrated in FIG. 2. The angle of the edge of the cutter or cutting means ($\alpha$ in the enlarged view of FIG. 2) preferably is in the range of 15° to 120°, more preferably 30° to 90°. The cutter (cutting means) is preferably made of strong steel, alloy, and ceramic.

Figure 2A:
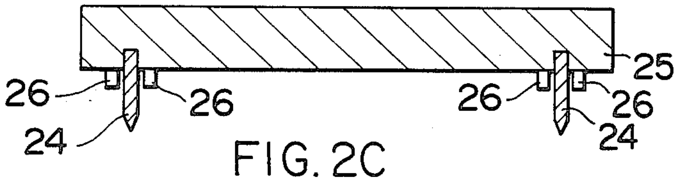
FIGS. 2A, 2B and 2C illustrate the constitution of a cutting means employable for preparing the radiation image storage panel of the invention, in combination with other members in one arrangement.
Figure 2B:
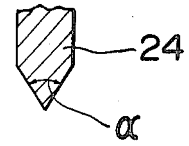
Figure 2C:
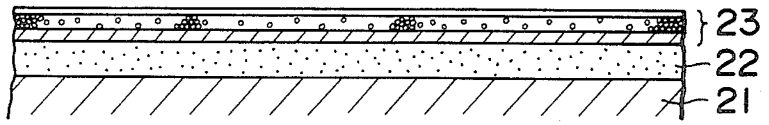

The above-mentioned process is further described below with reference to FIGS. 2A, 2B and 2C.

The cutting operation can be done on a continuous radiation image storage sheet material 23 arranged on a plank 22 of a soft material (e.g., rubber) or wood which is placed on a fixed substrate 21 by placing thereon under pressure two cutting means 24 having been arranged with space therebetween corresponding to the size of the desired radiation image storage panel. The angled edge of the cutting means serves for cutting the sheet material. The cutting can be composed of three or four cutting means for forming three or four edges of the radiation image storage panel at one time. The three or four cutting means can be arranged in one unit to form an endless belt-like cutter.

The cutting means 24 is preferably fixed through the base portion opposing its edge to a support 25 of a nonmetallic material having high compression strength, for example, a wood-made holder.

The cutting means 24 is preferably angled on both sides at the edge, as illustrated in the enlarged view of FIG. 2. The cutting means being angled on both sides effectively serves for giving the characteristic features of the invention to edges of two radiation image storage panels formed and separated on both sides of the cutting means by the cutting operation.

Further, the cutting means 24 is preferably provided adjacently with a memeber 26 made of an elastic material such as rubber which serves for pushing the continuous sheet material in the cutting operation. The pushing means further ensures the formation of the characteristic features on the edge portions of the phosphor layer of the radiation image storage panel according to the present invention.

We claim:

1. In a radiation image storage panel comprising a support, a phosphor layer containing a stimulable phosphor and a binder, and a protective film superposed in this order, the improvement in which the thickness of the phosphor layer at the edge on at least two sides being opposite to each other is thinner than the mean thickness of the phosphor layer and the density of the stimulable phosphor at said edge is higher than the mean density of the stimulable phosphor in the phosphor layer.

2. The radiation image storage panel as claimed in claim 1, wherein the thickness of the phosphor layer at the edge on all four sides is less than the mean thickness of the phosphor layer and the density of the stimulable phosphor at said edge is higher than the mean density of the stimulable phosphor in the phosphor layer.

3. The radiation image storage panel as claimed in claim 1, wherein the mean void ratio in the area from said edge of less thickness to the distance as long as one thirds of the mean thickness of the phosphor layer is 80% or lower based on the mean void ratio of the phosphor layer.

4. The radiation image storage panel as claimed in claim 1, wherein said edge of the phosphor layer having less thickness is coateed with a resin.

5. A process for preparing a radiation image storage panel comprising a support, a phosphor layer containing a stimulable phosphor and a binder, and a protective film superposed in this order by cutting a continuous radiation image storage panel sheet material, in which at least two edges of the panel being opposite to each other are formed by simultaneously cutting the continuous panel sheet material by means of a cutter having an angled edge.

6. The process for preparing a radiation image storage panel as claimed in claim 5, wherein all four edges of said panel is simultaneously formed by cutting the continuous sheet material at once by means of a cutter having an angled edge.

7. The process for preparing a radiation image storage panel as claimed in claim 5, wherein said cutter is angled on both sides at the edge.

8. The process for preparing a radiation image storage panel as claimed in claim 5, wherein a member for pushing the sheet material is provided adjacently to the cutter.

* * * * *